United States Patent [19]

Fineblum

[11] Patent Number: 4,918,937
[45] Date of Patent: Apr. 24, 1990

[54] HYBRID THERMAL POWERED AND ENGINE POWERED AUTOMOBILE AIR CONDITIONING SYSTEM

[76] Inventor: Solomon S. Fineblum, 112 Shady La., Randolph, N.J. 07869

[21] Appl. No.: 358,648

[22] Filed: May 30, 1989

[51] Int. Cl.$^5$ ................................................ F25B 1/06
[52] U.S. Cl. ..................................... 62/175; 62/238.4; 62/323.1; 62/500
[58] Field of Search .................... 62/323.2, 500, 238.4, 62/175

[56] References Cited

U.S. PATENT DOCUMENTS

| | | | |
|---|---|---|---|
| 3,922,877 | 12/1975 | Opher et al. | 62/500 X |
| 4,164,850 | 8/1979 | Lowe, Jr. | 62/500 X |
| 4,309,877 | 1/1982 | Tawse | 62/500 X |
| 4,345,440 | 8/1982 | Allen et al. | 62/500 X |
| 4,378,681 | 4/1983 | Modisette | 62/500 |
| 4,438,633 | 3/1984 | Hiser | 62/500 X |
| 4,523,437 | 6/1985 | Briley | 62/500 X |

*Primary Examiner*—William E. Tapolcai

[57] ABSTRACT

An air conditioning system with a common refrigerant supply, an engine-driven compressor circuit and a thermal compression circuit in parallel with the compressor circuit, a high efficiency compact thermal compressor which is either an ejector or a double vortex chamber flow inducer and a new control system which saves energy by unloading the mechanical compressor when thermal compression is fully operative. The hybrid system includes a check valve which prevents refrigerant flow from the compressor through the thermally powered compressor. Timers start the refrigerant pump of thermal compression circuit. Pressure switches sense operating pressure of the refrigerant. A refrigerant pump and a heat exchanger vapor generator generate high pressure refrigerant vapor which drives the thermal compressor. Refrigerant pump starts after initial cooling of passenger compartment is achieved by mechanical compressor circuit. Engine driven compressor is unloaded when outlet pressure of thermal compressor is high enough to drive system. The precooling of the passenger compartment by mechanical compressor and subsequent unloading and deactivation of the engine-driven mechanical compressor permits lower fuel consumption. The system can operate with ozone-sparing refrigerants to replace CFC refrigerants, as well as with R12.

11 Claims, 11 Drawing Sheets

HYBRID THERMAL POWERED AND ENGINE POWERED AUTOMOBILE AIR CONDITIONING SYSTEM

BACKGROUND OF THE INVENTION

1. Field of the Invention

The invention, in general, is in the field of hybrid automobile air conditioning systems which derive energy from the waste heat of the engine and which have been proposed in the literature for reducing fuel consumption and, in particular, in the fields of control systems and thermal compression means for improving the fuel savings with such automobile air conditioners.

The invention relates also to a new control system for disabling an engine-driven mechanical compressor which is employed for initially precooling the automobile interior before switching to a thermal powered refrigeration system, which operates in a refrigerant flow path which goes around the refrigerant flow path of the mechanical compressor.

The invention further relates to an improved double vortex chamber flow inducer used as a thermal compression means n a thermally powered compression circuit, in which the power for the circuit is derived from the waste heat from the coolant of the internal combustion engine.

The invention also relates to a more compact ejector which provides efficient cooling to permit significant fuel savings in the operation of an internal combustion engine and cooling the interior of an automobile or similar vehicle powered by the engine.

2. The Prior Art

R. W. Murphy disclosed in the article entitled: "Estimated Fuel Savings for Heat Pump Systems That Combine Ejectors and Engine Driven Compressors" presented at the ASME Winter Annual Meeting Boston Mass. Dec. 13-18, 1987 and reprinted as Publication Number 87-WA/AES-4 a hybrid system of an engine-driven compressor and an ejector heat pump. This hybrid system permits savings in power calculated at only 19% for a parallel circuit and only 11% savings for a series circuit, an ejector using the waste heat being in one circuit and an engine-driven compressor being in the other circuit. The calculations constitute the major contribution of the article. The problem of low percentage of energy savings is solved by the present invention which realizes a much greater savings. The circuit described by Murphy has no means of preventing parasitic recirculation of refrigerant flow through the thermal compression means which the present invention prevents.

Ophir et al., U.S. Pat. No. 3,922,877 shows the diversion of waste heat from the radiator liquid coolant of an automobile for powering an air conditioner in a system using an ejector to drive refrigerant waste toward an air cooled condenser. This system cannot perform cooling until the engine coolant is sufficiently heated. The present invention provides an instant "ON" as expected by passengers and as now provided.

Chen, in the article entitled "A Heat Driven Mobile Refrigeration Cycle Analysis" in *Energy Conversion*, Vol. 18, pages 25-29, Pergamon Press Ltd., 1978, Great Britain, optimistically describes a thermal compressor for mobile use utilizing engine waste heat for a 2000 cc automobile producing 2.34 tons of cooling effect while the power consumption was just 0.06 H.P. The system in his FIG. 4 includes a regenerator between the ejector and the air condenser and thus comprises a modification for this regenerator feature with respect to the Ophir et al patent. Chen also must delay operation until engine coolant is hot enough and has no back-up in case the refrigerant pump fails.

Fineblum, the present inventor, in a paper entitled "Vortex Diodes" presented at the Fluidic State Of The Art Symposium, Sept. 30–Oct.3, 1974, Vol. 1, pages 48 through 89, describes a method for predicting and improving the pressure drop efficiency of a vortex chamber which is incorporated in the expansion portion of improved double vortex chamber thermal compression means as taught herein.

Modisette, U.S. Pat. No. 4,378,681, granted Apr. 5, 1983, discloses a double vortex chamber thermal compression means with a swirling expansion chamber device in a cooling circuit in which the high pressure refrigerant vapor enters the vortex expansion chamber and then passes into a diffuser chamber. The chambers are of a shape to generate excessive boundary layer related flow restriction and energy loss, which the present invention avoids. In addition, Modisette shows no back-up provisions while the present invention does.

J. C. Dutton and B. F. Carroll in the paper entitled "Optimal Supersonic Ejector Designs" published in the *Transactions of ASME Journal of Fluids Engineering*, Vol. 108, December 1986, disclose that the mixing section in an ejector should have a flow area which is twice the flow area of the primary nozzle in order to achieve optimum performance.

In an article by B. M. Agrow and G. Emanuel entitled "Comparison of Minimum Length Nozzles" published in the *Journal of Fluids Engineering*, September 1988, there is disclosed the teaching that the diffuser section of nozzles should expand in a gentle curve. The present invention combines these findings synergistically into a more efficient and compact ejector.

Lofgreen et al., U.S. Pat. No. 3,470,707 dated Oct. 7, 1969, discloses an automobile refrigeration system utilizing the waste heat from the exhaust manifold of an automobile engine. The apparatus in this patent requires pumps to pump the vapor and the liquid refrigerant separately and further requires a separator to separate the liquid from the vapor from the evaporator. The waste heat from the engine is used merely to heat the liquid and the separation requirement helps the system by reducing the energy required for the vapor pump but these features are significantly different from those in the present invention.

Trumpler, U.S. Pat. No. 2,411,347 discloses a turbine pump in combination with a compressor together with a boiler 14 connected to the compressor for cooling in an air conditioner for an automobile or for a railroad car. The compressor 16, which is used by Trumpler is driven by what is called a wobble plate engine. A control is provided in a refrigeration circuit in the form of an evaporation expansion valve and this control serves to direct the flow of the refrigerant to either the boiler or to the evaporator. The extra complexity and cost of such equipment and lack of instant "ON" are avoided by the present invention.

Dasher, U.S. Pat. No. 2,532,012 shows a cooling system in an automobile utilizing a rotary gas motor, a compressor, and switches controlled by pressure which develops in the receiver. A valve is provided in this system to utilize the waste heat from the exhaust. The control switch for the motor pump compressor is controlled by the pressure in the receiver. This system has no back-up, no instant "ON" and may interfere with the pollution control features of contemporary exhaust systems.

Rogers, U.S. Pat. No. 2,991,632 discloses an automobile air conditioner using waste heat of the engine as a source of heat powered refrigeration. A boiler for the refrigerant furnishes superheated vapor to drive the hot gas motor which drives the compressor. The engine compressor and pump are all constructed in a sealed unit. The mechanical devices are of greater complexity and cost with no significantly greater efficiency than thermal compression means and no back-up in case of failure while the present invention is mechanically simpler and has a back-up feature for improved reliability.

P. B. Keller, U.S. Pat. No. 2,869,332 shows a refrigeration system powered by the waste heat of an engine used to boil liquid refrigerant and the resultant vapor is separated from the remaining liquid and used to drive a turbine which drives a refrigeration compressor through a speed reduction gear box. The system requires the complexity of a high speed turbine and a reductor gear box which is very expensive and cannot begin to function until the engine coolant is hot enough and has no back-up for the waste heat powered system, which the present invention has, along with greater simplicity and concomitant reduced first cost and reliability.

E. P. Volchkov et al. in a 1982 paper "Hydrodynamics of a Vortex Chamber with Hyperbolic End Covers," *FLUID MECHANICS Soviet Research*, Vol. 11, No. 6 November–December 1982, 1984 Translation-Scripta Publishing, demonstrated that the boundary effects were weak and that the circulation in the vortex chamber had no significant losses compared to ideal free vortex flow if the vortex chamber was expanded toward the central axis in a manner which is approximately hyperbolic, that is, the axial dimension increases as the radius decreases; $xr =$ constant where x is the axial dimension and r is the vortex chamber radius.

C. Rodgers in an ASME publication, "The Performance of Centrifugal Channel Diffusers" ASME 82-GT-10, shows that optimum pressure recovery is achieved in the diffuser channel of a centrifugal compressor if the velocity from the whirling impeller is decreased by 45 to 50% before it reaches the diffuser vanes.

SUMMARY OF THE INVENTION

It is one object of this invention to provide for much larger savings than the hybrid systems taught elsewhere. It is another object to provide for a rapid availability of cooling effect as now expected by present passengers and as now provided by modern automobile air conditioners along with energy savings. It is another object of this invention to provide for improved reliability by simplicity of construction and operation and a back-up means. It is another object to provide for a relatively inexpensive, as well as energy conserving, automobile air conditioning system. It is another object to provide for a more efficient thermal compression means in the form of an improved double vortex chamber thermal compressor. It is another object of this invention to provide for a thermal compression means in the form of a more compact ejector.

The foregoing objects can be accomplished by placing a thermal compression means in the form of an ejector or a double vortex chamber flow inducer in a refrigerant flow path around the engine-driven mechanical compressor of an automobile air conditioning system and by placing a liquid refrigerant flow path into a refrigerant pump and a hot, coolant-heated, heat exchanger - vapor generator such that, after the engine-driven mechanical compressor has driven the refrigeration process sufficient to initially cool the passenger compartment, the refrigerant pump is actuated to drive high pressure liquid refrigerant into the hot, engine-coolant heated heat-exchanger-vapor generator wherein the liquid refrigerant is turned into a hot, high pressure vapor which has the energy to drive a thermal compression device such as an ejector or a double vortex chamber flow inducer which can develop, in the upstream portion of the device, a low internal pressure that acts to draw vapor from the evaporator and, in a downstream portion, develops high pressure in the diffuser outlet which can drive the refrigerant into the condenser for exothermal condensation, as required, prior to expansion into the downstream evaporator. When the thermal compressor outlet pressure is great enough to drive the refrigeration process, the control system will act to shut off the engine-driven mechanical compressor such that the automobile air conditioning function is powered primarily by the waste heat driven thermal compression means with great energy conservation in the operation of the air conditioning system which consumes more energy than any other non-propulsion accessory in the automobile.

BRIEF DESCRIPTION OF THE DRAWINGS

For a more complete understanding of the present invention and the advantages thereof, reference is now made to the following description, taken in conjunction with the accompanying drawings in which.

The following description of the preferred embodiment of the invention has been presented for the purpose of illustration and description. It is not intended to limit the invention to the precise form disclosed. It is intended that the scope of this invention not be limited by the detailed description herein and that many modifications and variations are possible in the light of the teachings herein disclosed.

DESCRIPTION OF PREFERRED EMBODIMENTS

Figure 1:
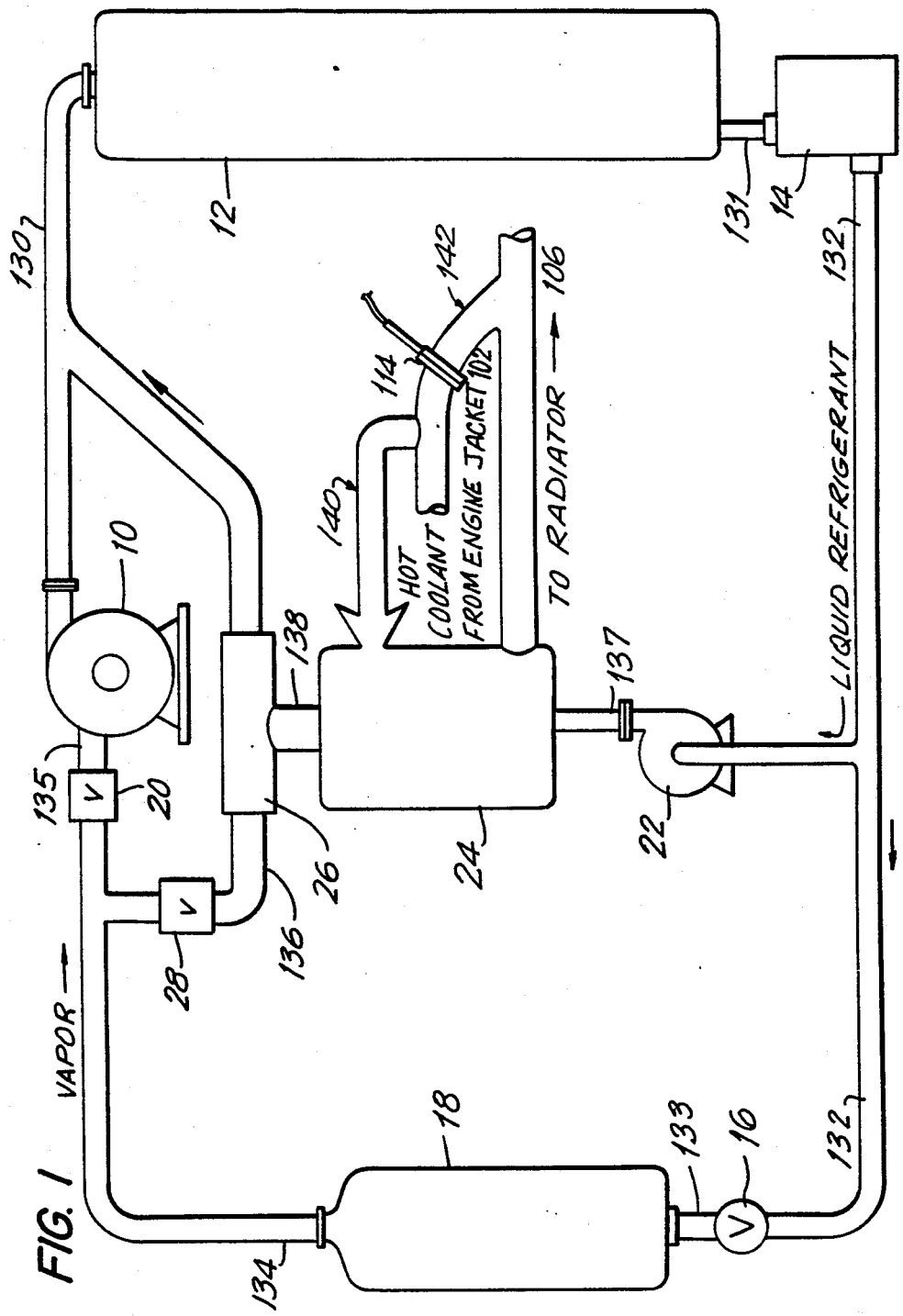
FIG. 1 is a schematic of the refrigerant flow circuit with ejector.
Figure 2:
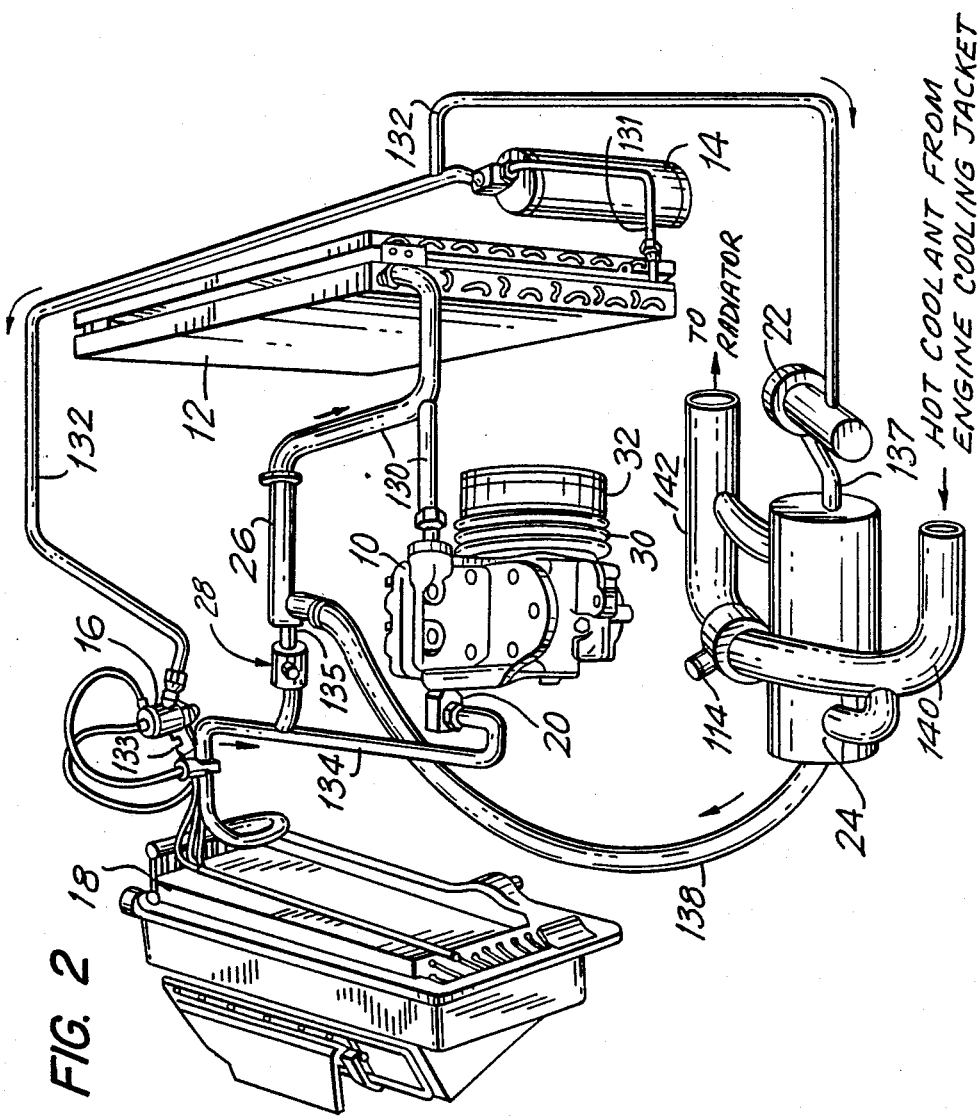
FIG. 2 is a simplified perspective of an installation of a preferred embodiment of the hybrid automobile air conditioning system with an ejector.

In FIGS. 1 and 2 the functioning components comprise a compressor 10, a connected pulley 30, a magnetic clutch 32, a condenser 12, a receiver-dryer 14, expansion valve 16, evaporator 18 and a suction valve 20. An ejector 26, a check-valve 28, a refrigerant pump 22, a pump pulley 40, another magnetic clutch 42, and a vapor generator-heat exchanger 24, are also provided for thermally powered refrigeration. Hoses, tubes and connectors are provided to form a leak-proof refrigerant flow circuit as described as follows:

The above listed components are arranged in a system wherein the compressor outlet leads to one branch of a "Y" junction, the other branch being downstream of the check valve 28 and outlet of the ejector 26 which are in series. The two branches of the "Y" join into one hose and connector assembly 130, which directs refrigerant into the condenser 12 which is just upstream of the tube and connector assembly 131 and receiver-dryer 14. Receiver-dryer 14 is just upstream of a "Y" junction which has a first branch leading to a thermal expansion valve 16, a connector assembly 133 and the evaporator 18 and has a second branch which is connected to the refrigerant pump 22, the complete tubing and connector assembly being 132. The refrigerant pump 22 is just upstream of the tube and connector assembly 137 and the vapor generator-heat exchanger 24, which, in turn, is just upstream of the primary inlet of the ejector 26. Ejector 26 is in series with the check valve 28 which is upstream of the "Y" fitting that joins the refrigerant flow from the compressor 10 and which is part of forementioned assembly 130. The ejector 26 is in a flow path around the compressor 10 and suction valve 20 with the secondary inlet of the ejector 26 being just downstream of a "Y" junction, at which junction the suction line from the evaporator 18 divides into two paths, one path being toward the suction valve 20 which is just upstream of the compressor 10 and the other path of the hose and connector assembly 134 being from the "Y" junction into the secondary inlet of the ejector 26 and check valve 28, which are in series.

In addition, there are mode doors and fan and associated temperature actuated controls as required to provide satisfactory cooling within the passenger compartment by the fan generated air flow past the evaporator 18. These components, however, which are conventional in automobile air conditioning installations, are contemplated to be part of this invention but require no further description.

Figure 3:
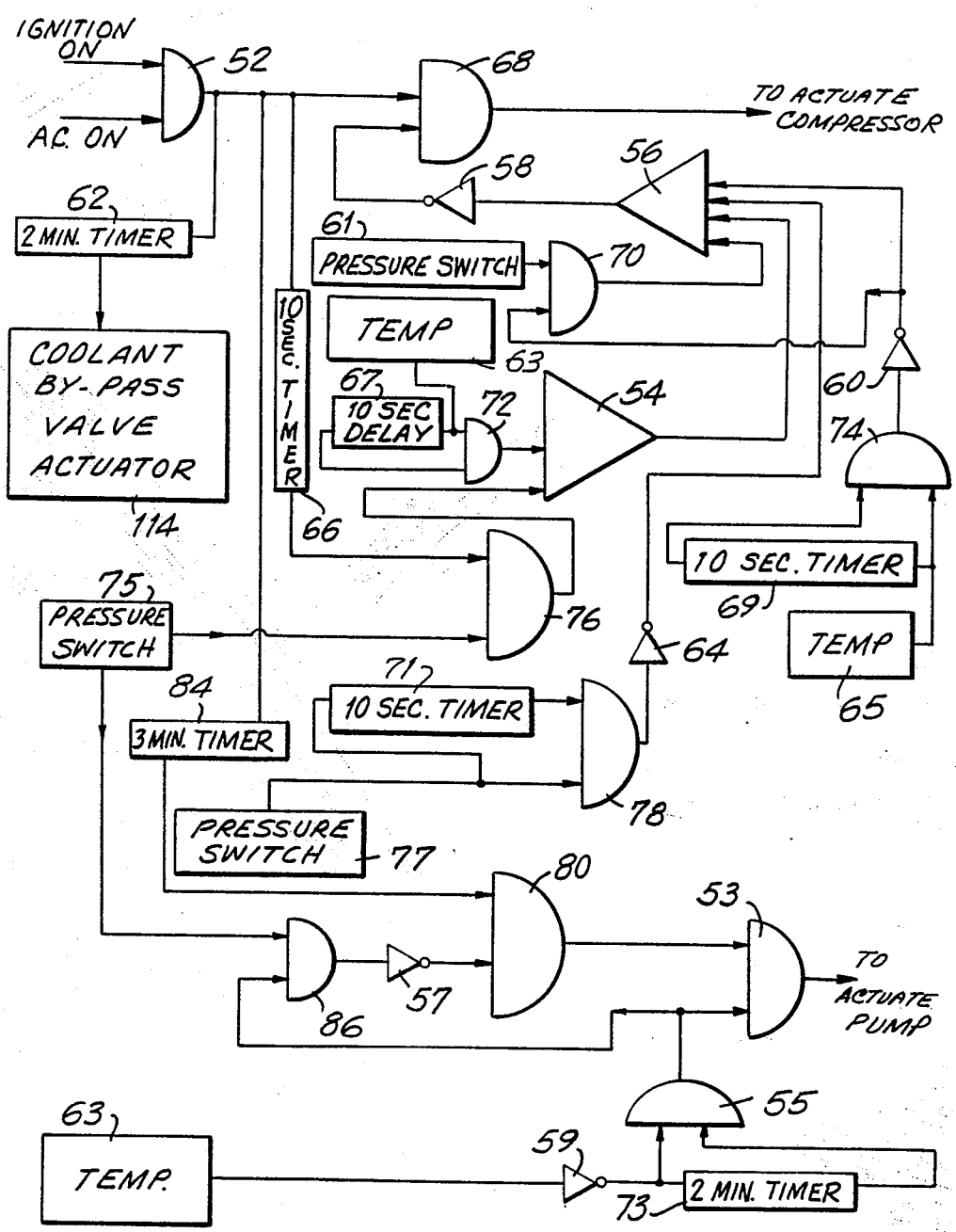
FIG. 3 is the logic circuit for the control system.

FIG. 3 shows the logic circuit of the control system which comprises in a preferred embodiment eleven two-input BOTH-AND logic elements, a two-input EITHER-OR logic element 54, a four-input EITHER-OR logic element 56, five NOT logic elements, a three-minute timer 60, a two-minute timer 62, a one-minute timer 73 and four ten-second timers, two thermostatic switches, and three pressure switches.

The ignition "ON" and air conditioning "ON" are the two signals required to actuate the first two-input BOTH-AND logic element 52 to generate four output signals which simultaneously delivers a signal to a second two-input BOTH-AND logic element 68, a ten-second timer 66, a three-minute timer 60, and a two-minute timer 62. The second two-input BOTH-AND logic element 68 has, as one input, the signal from the first two-input BOTH-AND logic element 52, and a NOT logic element 58. The output of this second two element BOTH-AND logic element 68 is a signal to actuate the mechanical compressor 10. The two-minute timer 62 actuates the coolant by-pass valve 114 to close. Said three-minute timer 84 sends a signal to another two-input BOTH-AND logic element 80. Another two-input BOTH-AND logic element 70 is actuated by two input signals, one signal indicating that the pressure switch 61 has sensed a diffuser pressure of 146 psig or more. The other required signal originates from a temperature switch 65 which indicates an evaporator temperature of 52° F. or less. The output signal from said two-input BOTH-AND logic element 70 is a signal to the four-input EITHER-OR logic element 56. The two-input EITHER-OR logic element 54, has two inputs, one is a low, evaporator temperature signal from the temperature switch 63. After a delay as signaled by another ten-second timer 67 another two-input BOTH-AND logic element 72 which generates an output signal from logic element 54. The other input to logic element 54 is a signal from another two-input BOTH-AND logic element 76 which, in turn, is actuated by a ten-second delay signal from a timer 66, and a low-pressure switch 75 which is activated by a pressure of 60 psig or less, and which acts to halt compressor and pump operation. The output of the two-input EITHER-OR logic element 54 is a signal to the four-input EITHER-OR logic element 56. The afore-mentioned pressure switch 75 also sends a signal to a two-input BOTH-AND logic element 86, which, in turn, send a signal to a NOT logic element 57, which sends a negating signal to the two-input BOTH-AND logic element 80 which also requires a three-minute TIME-ON signal from the three-minute timer 84 and when both input signals are available, it sends a signal to another two-input BOTH-AND logic element 53, which sends a signal to actuate the refrigerant pump. The two-input BOTH-AND logic element 78 is activated by two-input signals, one from a low condenser pressure switch 77 and a ten second-timer 71 and when so activated sends a signal, through the NOT logic element 64, to the aforementioned four-input EITHER-OR logic element 56. Another two-input BOTH-AND logic element 74 is activated by a temperature switch 65 which generates a signal if the evaporator temperature rises above 52° F., and a ten second-timer 69 and, if so activated, it sends a signal through a NOT logic element 60 which, in turn, transmits the negated signal to both the said two-input BOTH-AND logic element 70 and to the four input EITHER-OR logic element 56 which sends a signal through the NOT logic element 58 to the aforementioned two-input BOTH-AND logic element 68 which, in turn, actuates the mechanical compressor 10 to "ON." Another two-input BOTH-AND logic element 55 is actuated by a two-minute timer 73 and a negated signal from a NOT logic element 59 which, in turn, is actuated by a signal from aforementioned low-temperature switch 63. The output signal from two-element BOTH-AND logic element 55 goes to the two-element BOTH-AND logic elements 86 and 53.

Figure 3A:
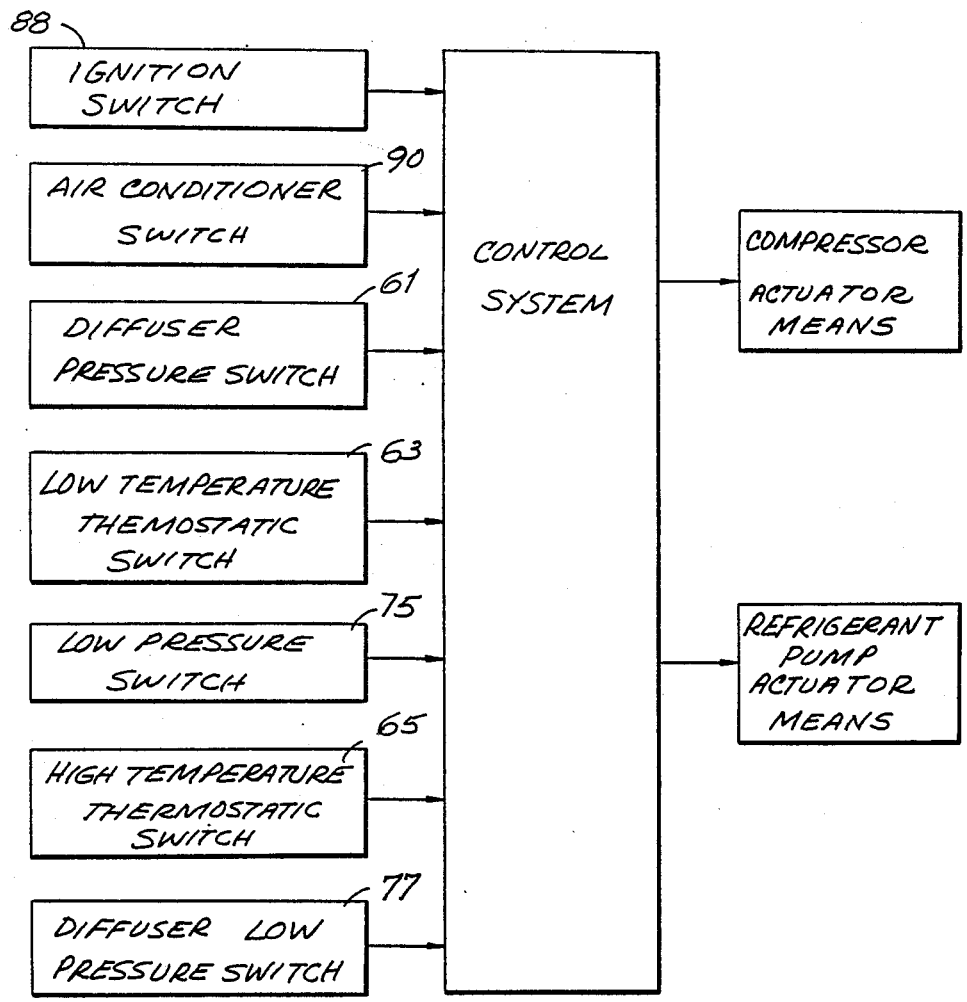
FIG. 3A is a simple input-output schematic of the control system.

FIG. 3A is an input-output schematic of the control system wherein input signals originate from the ignition switch 88, the air conditioner "ON" switch 90, the diffuser pressure switch 61, the evaporator thermostatic switch 63, the condenser pressure switch 75, a second evaporator thermostatic switch 65, and a diffuser low pressure switch, and the output signals which actuate the compressor 10 by means of the compressor magnetic clutch 32 and the refrigerant pump 22 by means of the refrigerant pump magnetic clutch 42 or refrigerant pump AC motor.

Operation of this embodiment as presented in FIGS. 1, 2, 3, and 3A starts with compressor 10, activated by the air conditioning "ON" switch 90, through the magnetic clutch 32 initiating refrigerating operation followed by a very brief period of simultaneous operation of the compressor 10, of the conventional mechanical compression system along the parallel system driven by the liquid refrigerant pump 22 and the ejector as thermal compressor 26, and finally, the exclusive operation of the waste-heat powered system driven by the liquid refrigerant pump 22 and ejector 26 with the compressor 10 being deactivated.

Specifically, when the air conditioning ON-OFF switch 90 is placed in the "ON" position, the magnetic clutch 32, of the compressor 10, is energized by a signal from the two-input BOTH-AND logic element 68, to draw refrigerant vapor from evaporator 18, to compress such vapor and to drive the high pressure vapor into the condenser 12. In the condenser 12 the vapor condenses and the condensed liquid flows into and through the receiver-dryer 14 and through the expansion valve 16 into evaporator 18. In evaporator 18, the refrigerant evaporates endothermally and cools the evaporator 18 to provide the desired cooling. Initial cool-down will be accomplished by the action of the compressor driven refrigerant flow through the system and a lowered temperature is soon achieved in the passenger compartment of the automobile. After two minute of compressor operation, a timer 62, will send a signal to close off the coolant by-pass valve and force hot coolant into the vapor generator 24. A timer 60 will operate when the compressor 10 has been functioning for about three minutes. The functioning of the three-minute timer 60 will, by a signal from the input BOTH-AND logic element 53, actuate the refrigerant pump clutch 42 to engage and to drive the refrigerant pump 22, which will drive liquid refrigerant into the hot coolant heated vapor generator-heat exchanger 24. The hot, high pressure vapor generated therein will be accelerated in the primary nozzle 82 of the ejector 26 and to generate a low pressure, which will induce refrigerant vapor flow from the evaporator 18 and then the pressure will be increased in the diffuser section of the ejector 26 to drive the vapor mixture into the condenser 12 as required.

As soon as the refrigerant pressure downstream of the diffuser portion of the refrigerant powered ejector 26 is high enough, about 146 psig, as detected by a pressure switch 61, the compressor clutch 32 will be disengaged by loss of signal from two-input BOTH-AND logic element 68. This disengagement of the clutch to deactivate the compressor saves fuel and generates the energy saving. If the waste heat powered refrigerant driven system should fail, the drop of pressure to below 120 psig downstream of the diffuser of the ejector 26 would be detected by the pressure switch 77 to re-engage the compressor clutch 32, by action of the logic elements 78, 64, 56, 58 and 68, to restore mechanical compressor 10 operation.

When the refrigerant pump 22 and ejector 26 are effective, some of the liquid refrigerant from the condensor 12 and reservoir 14 will be pressurized in the pump 22 to about 260 psig and boiled in the vapor generator 24 at a temperature of approximately 160° F. (71° C.) and superheated to about 212° F. (100° C.) to continue the power cycle by entering the primary nozzle 82 of the ejector 26 to draw vapor from the evaporator 18 and to compress and to drive the refrigerant vapor forward into the condenser 12 as required for the refrigeration cycle.

If, however, the evaporator 18 threatens to freeze at a temperature of 32° F. (0° C.), the thermostatic switch 63 opens and the magnetic clutches 32 and 42 of the compressor 12 and refrigerant pump 22, respectively, are decoupled whereby the compressor 10 and refrigerant pump 22 are stopped until the evaporator becomes warmer. At such warming, the thermostatic switch 63, after a two-minute delay as generated by timer 73 will re-open and act to restart refrigerant pump 22 to continue normal operation.

If, however, the evaporator temperature ever exceeds 52° F. (approximately 11° C.), as detected by temperature switch 65, the compressor 10 will be reactivated by signals from logic elements 74, 60, 56 and 58 into logic element 68. This provision increases the reliability of the system.

If a loss of refrigerant occurs, a pressure switch 75 is provided which will detect the consequent drop of refrigerant pressure of about 60 psig or less and will open the magnetic clutch circuits and, thereby, shut-off both the compressor 10 and the refrigerant pump 22.

This system, which is achieved by the control logic circuit shown herein in FIG. 3 and 3A, is preferred for the embodiments shown in FIGS. 1, 2, 4, and 10. As is well known, integrated circuits, electronic circuits, electromechanical, and electro-magnetic switching devices may be interchanged to fulfill the functions of the logic circuit, as shown in FIG. 3 whenever of practical benefit. Specifically, relay that control electrical current to a device may be replaced by transistors. Known combinations of transistors function as logic elements and timing circuits. Similarly, a thermistor can vary the resistance of a circuit and, with an amplifier, can act as a thermostatic switch.

This invention includes all necessary amplifiers to amplify signals from the logic circuit to sufficient power to operate the switches for the magnetic clutch and other powered devices as required.

This invention also includes obvious simplifications such as, for instance, the replacement of an AND and a NOT combination by a NAND logic element and the replacement of two diffuser pressure switches by a single double-acting pressure switch.

As a result of the operation of this system, energy will not be drawn from the engine crankshaft to drive the compressor 10 and the primary work of the refrigeration cycle for automotive air conditioning will be derived from the waste-heat energy recovered from the hot coolant from the cooling jacket 110 of the engine with a resulting substantial energy saving.

Figure 4:
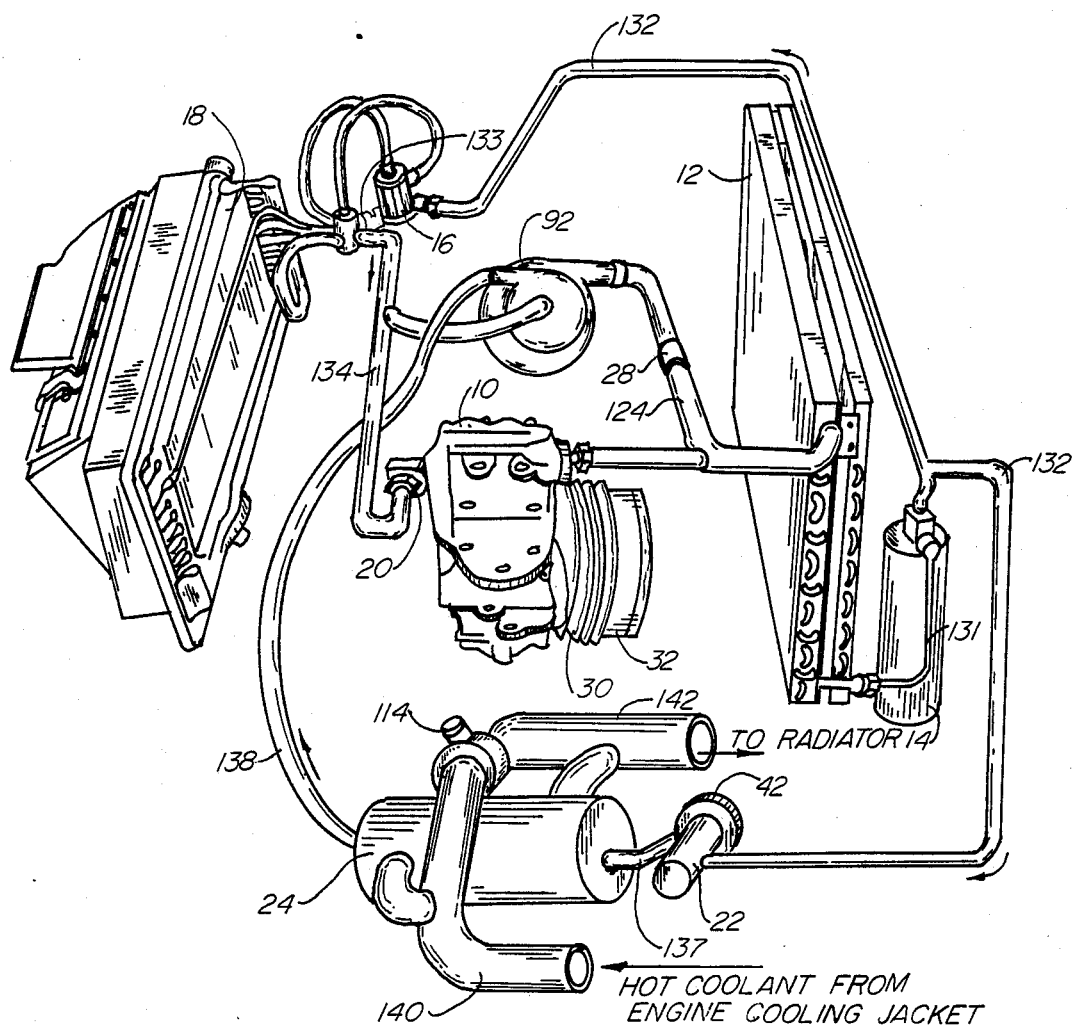
FIG. 4 is a simplified perspective of an installation of the system with a double vortex chamber thermal compressor.

In FIG. 4 the functioning components of another embodiment comprise a compressor 10, a connected pulley 30, a magnetic clutch 32, a condenser 12, a receiver-dryer 14, expansion valve 16, evaporator 18 and a suction valve 20, a double vortex chamber flow inducer 92, a check-valve 28, a refrigerant pump 22, a pump pulley 40, another magnetic clutch 42 and a vapor generator-heat exchanger 24 are also provided for thermally powered refrigeration. Hoses, tubes and connectors are provided to form a leak-proof refrigerant flow circuit as described as follows and a control system as already described in FIGS. 3 and 3A.

The above listed components are arranged in a system, as illustrated in FIG. 4, wherein the compressor outlet leads to one branch of a "Y" junction, the other branch being downstream of the check valve 28 and outlet of the double vortex chamber flow inducer. The two branches of the "Y" join into one hose and connector assembly 124 which directs refrigerant into the condenser 12, which is just upstream of the tube and connector assembly 131 and receiver-dryer 14. Receiver-dryer 14 is just upstream of a "Y" junction, which has a first branch leading to a thermal expansion valve 16, a connector assembly 133 and the evaporator 18 and has a second branch which is connected to the refrigerant pump 22, the complete tubing and connector assembly being 132. The refrigerant pump 22 is just upstream of the tube and connector assembly 137 and the vapor generator-heat exchanger 24, which, in turn, is just upstream of the primary inlet of the double vortex chamber flow inducer 92, which is in series with the check valve 28 both of which are upstream of the "Y" fitting that joins the refrigerant flow from the compressor 10 and which is part of assembly 124. The double vortex chamber 92, is in a flow path around the compressor 10 and suction valve 20, with the secondary inlet of the double vortex chamber flow inducer being just downstream of a "Y" junction, at which junction the suction line from the evaporator 18 divides into two paths, one path being toward the suction valve 20, which is just upstream of the compressor 10 and the other path of the hose and connector assembly 134 being from the "Y" junction into the secondary inlet of the double vortex chamber flow inducer 92, and check valve 28, which are in series.

In addition, there are mode doors and associated temperature actuated controls as required to provide satisfactory cooling within the passenger compartment by the fan generated air flow past the evaporator 18. These components, however, which are conventional in automobile air conditioning installations, are contemplated to be part of this invention but require no further description.

Operation of this embodiment of FIGS. 4, 3, and 3A, starts with compressor 10, activated by the air conditioner "ON" switch 90 through the magnetic clutch 32 initiating air conditioner operation, followed by a very brief period of simultaneous operation of the compressor 10, of the conventional mechanical compression system along the parallel system driven by the liquid refrigerant pump 22 and the double vortex chamber flow inducer 92, thermal compressor, and finally the exclusive operation of the waste-heat powered system driven by the liquid refrigerant pump 22 and double vortex chamber flow inducer 92 with the compressor 10 being deactivated.

Specifically, when the air conditioner ON-OFF switch, 90 is placed in the "ON" position, the magnetic clutch 32, of the compressor 10, is energized by signal from the two-input BOTH-AND logic element 68 to draw refrigerant vapor from evaporator 18, to compress such vapor and to drive the high pressure vapor into the condenser 12. In the condenser 12 the vapor condenses and the condensed liquid flows into and through the receiver-dryer 14 and through the expansion valve 16 into evaporator 18. In evaporator 18, the refrigerant evaporates endothermally and cools the evaporator 18 to provide the desired cooling. Initial cool-down will be accomplished by the action of the compressor driven refrigerant flow through the system and a lowered temperature is soon achieved in the passenger compartment of the automobile. After two minutes of compressor operation, the timer 62 will actuate the coolant by-pass valve 114 to close and force coolant into the vapor generator 24. A timer 84 will operate when the compressor 10 has been functioning for about three minutes. The functioning of the three-minute timer 84 will, by a signal from the input BOTH-AND logic element 53, actuate the refrigerant pump clutch 42 to engage and to drive the refrigerant pump 22 which will drive liquid refrigerant into the hot coolant heated vapor generator-heat exchanger 24. The hot, high pressure vapor generated therein by the heat from the hot coolant will be accelerated in the primary tangential nozzle 100 of the double vortex chamber flow inducer 92, to generate a low pressure which will induce refrigerant vapor flow from the evaporator 18 and then the pressure will be increased in the diffuser chamber 96 of the double vortex chamber flow inducer 92, to drive the vapor mixture into the condenser 12 as required.

As soon as the refrigerant pressure downstream of the diffuser chamber 96 of the refrigerant powered double vortex chamber flow inducer 92 is high enough, about 146 psig (161 psia), as detected by a pressure switch 61, the compressor clutch, 32 will be disengaged by loss of signal from two-input BOTH-AND logic element 68. This disengagement of the clutch to deactivate the compressor saves fuel and results in significant energy saving. If the waste heat powered refrigerant driven system should fail, the drop of pressure to below 120 psig downstream of the diffuser chamber of the double vortex chamber flow inducer 92, would be detected by the pressure switch 77 to re-engage the compressor clutch 32, by action of the logic elements 78, 64, 56, 58 and 68, to restore mechanical compressor 10 operation.

When the refrigerant pump 22 and double vortex chamber flow inducer 92, are operating, some of the liquid refrigerant from the condensor 12 and reservoir 14 will be pressurized in the pump 22 to about 260 psig and boiled in the vapor generator 24 at a temperature of approximately 160° F. and superheated to about 212° F. (100° C.) to continue the power cycle by entering the primary nozzle 100 of the double vortex chamber flow inducer 92, to draw vapor from the evaporator and to compress and to drive the refrigerant vapor forward into the condenser 12 as required for the refrigeration cycle.

If, however, the evaporator 18 threatens to freeze at a temperature of 32° F. (0° C.), the thermostatic switch 63 opens and the magnetic clutches 32 and 42 of the compressor 12 and refrigerant pump 22, respectively, are decoupled whereby the compressor 10 and refrigerant pump 22 are stopped until the evaporator becomes warmer. At such warming, the thermostatic switch 63, after a two minute delay as generated by timer 73, will reclose and act to restart refrigerant pump 22 to continue normal operation.

If, however, the evaporator temperature ever exceeds 52° F. (approximately 11° C.) as detected by temperature switch 65, the compressor 10 will be reactivated by signals from logic elements 74, 60, 56 and 58 into logic element 68. This provision increases the reliability of the system.

If a loss of refrigerant occurs, a pressure switch 75 is provided which will detect the consequent drop of refrigerant pressure to about 60 psig or less and will open the magnetic clutch circuits and, thereby, shut off both the compressor 10 and the refrigerant pump 22. This operation is achieved by the control logic circuit shown herein in FIGS. 3 and 3A.

As a result of the operation of this system, energy will not be drawn from the engine crankshaft to drive the compressor 10 and the primary work of the refrigeration cycle because automotive air conditioning will be derived from the waste-heat energy recovered from the hot coolant from the cooling jacket 110 of the engine with a resulting substantial energy saving.

Figure 5:
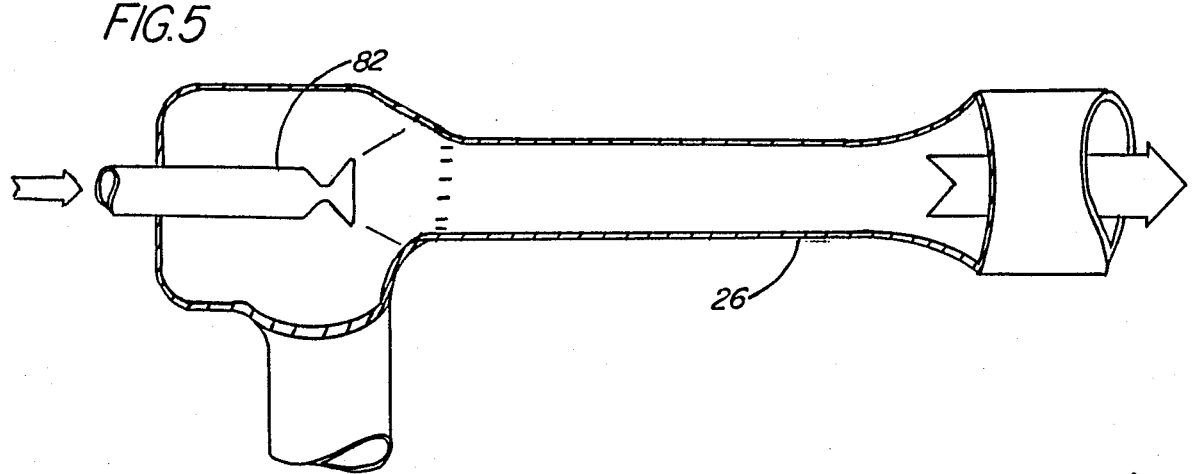
FIG. 5 is a section of a compact ejector.
Figure 5A:
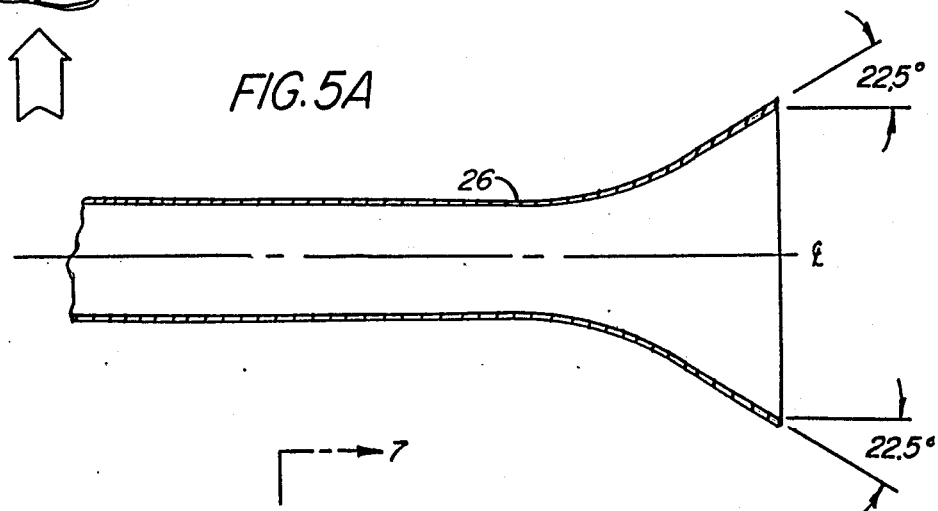
FIG. 5A is a detail of the diffuser of the ejector.

In FIGS. 5 and 5A, the primary inlet of the ejector 24 shown in FIG. 5 will be approximately 0.7±05" I.D. to accommodate vapor from the vapor generator 24 at an approximate 15 pound per minute flow rate for a nominal one-ton rating. The secondary inlet will be between 1.00 and 1.125" I.D. to accommodate 4 pounds per minute from the evaporator 18. The ejector outlet from the diffuser will pass 19 pounds per minute of 161 to 165 psig refrigerant vapor in a 2" I.D. tube, which will transmit the vapor into the condenser 12.

The primary inlet tube will enter a plenum and the flow will be accelerated to supersonic velocity in a convergent-divergent nozzle 85, with a 0.145" throat diameter and a 0.41" outlet diameter. The supersonic flow will expand against the convergent entrance to the mixing section to form a standing wave. The convergent section will generate a deceleration of the supersonic flow.

The primary flow mixes with the secondary flow in the mixing section, which has twice the flow area as the primary nozzle mouth for optimum performance [Reference: J. C. Dutton and B. F. Carroll "Optimal Supersonic Ejector Designs," *Transactions of ASME Journal of Fluids Engineering*, Vol. 108, December 1986, page 417, FIG. 4], and a diameter of 0.58". The mixing section extends for 8 diameters, 4.64", from the nozzle. The nozzle extends approximately 2.0" to 2.5" into the suction plenum.

The secondary flow from the evaporator expands into the suction plenum which is approximately 2" in diameter and large enough to smoothly decelerate the vapor to prevent any significant pressure drop. The area around the nozzle in the plane of the nozzle outlet is approximately 1.75" diameter with a net 2.2 square inch area for the passage of the low pressure vapor. Then, it will be accelerated in the convergent section leading to the mixing section wherein the vapor from the evaporator 18 will be mixed with the primary flow which is being simultaneously decelerated. At the end of this mixing section, the diffuser expands in a curve with a decreasing radius of curvature so that the exit angle ends at approximately 45°. In this manner, a shorter but efficient diffuser nozzle is achieved (Reference, B. M. Agrow and G. Emanuel, "Comparison of Minimum Length Nozzles,"*Journal of Fluids Engineering*, September 1988, Vol. 110, pages 283-288). The diffuser nozzle length is approximately 4.5" with a 2" diameter outlet.

The total length is from 11.6 to 14.0" depending upon the inlet fittings and the arrangement of such fittings.

Figure 6:
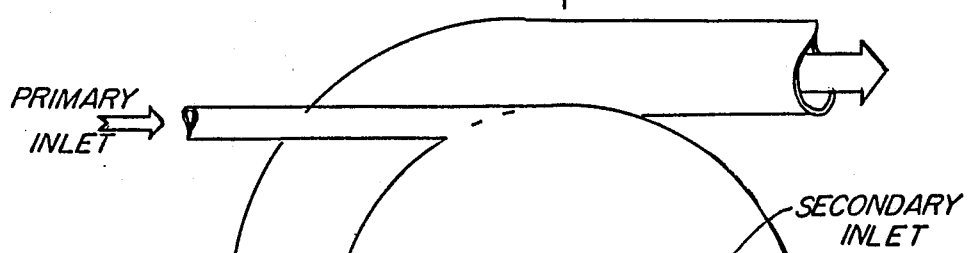
FIG. 6 shows an external view of the double vortex chamber thermal compressor.
Figure 7:
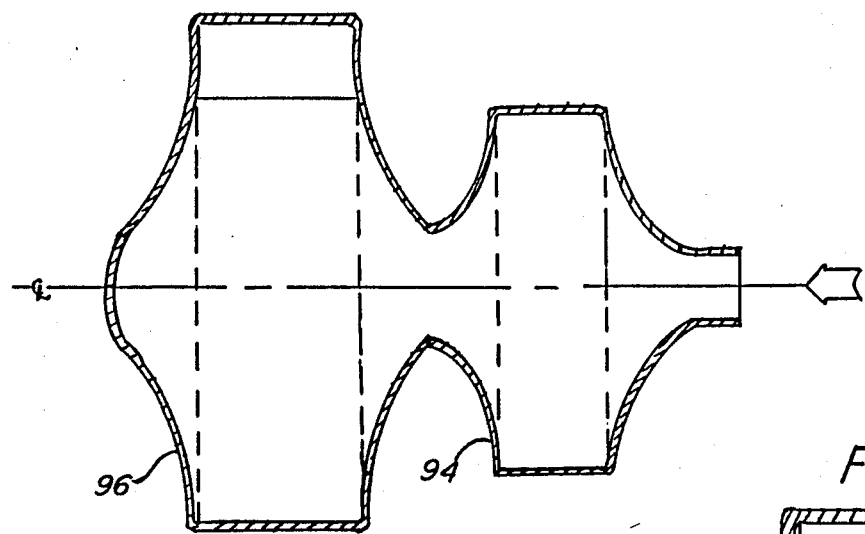
FIG. 7 shows a cross-section view of vortex chamber thermal compressor along line A—A of FIG. 6.
Figure 7A:
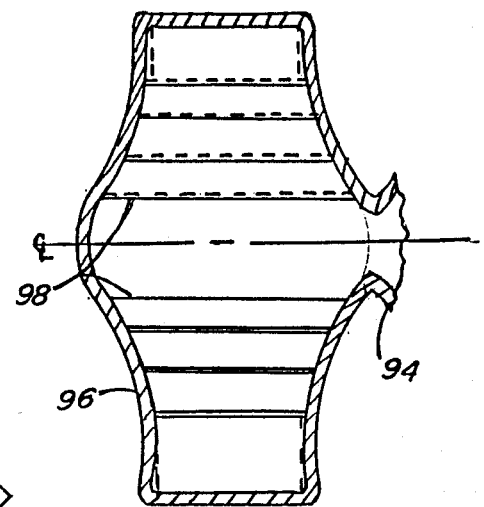
FIG. 7A shows a cross-section of vortex chamber thermal compressor with guide vanes.
Figure 8:
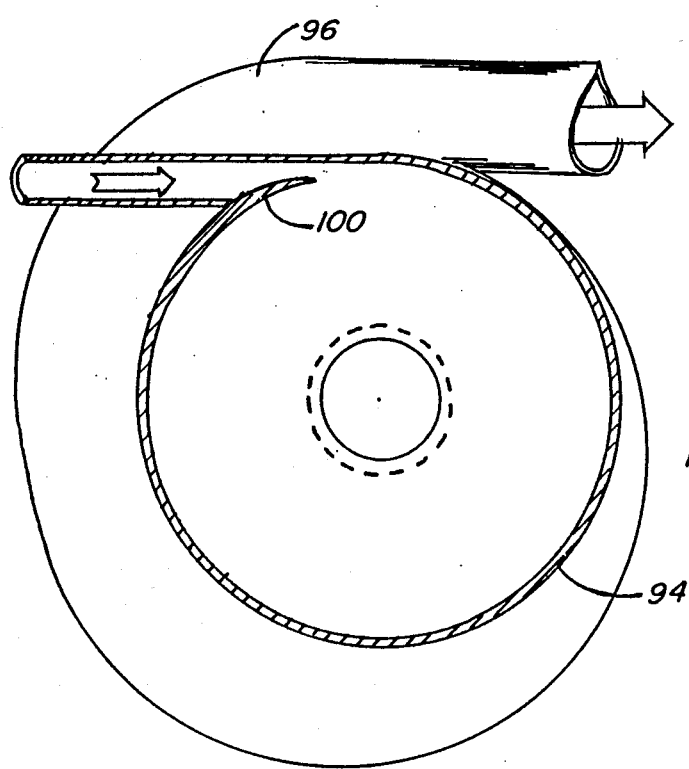
FIG. 8 shows a cross-section view of the expansion chamber of double vortex chamber thermal compressor.
Figure 9:
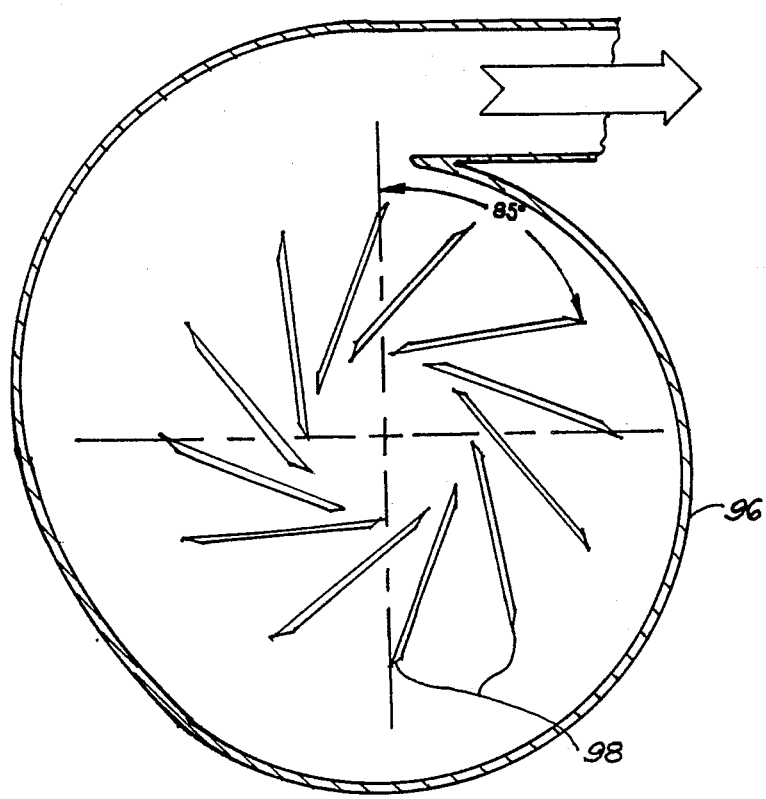
FIG. 9 shows a cross-section view through diffuser chamber of double vortex chamber through compressor with guide vanes.

FIG. 6 is an exterior view, while FIGS. 7 to 9 are sectional views of a double vortex chamber thermal compressor for drawing refrigerant vapor from the evaporator 18, compressing it, and driving it into the condenser 10.

In FIG. 7 there is shown a cross-sectional view of the thermal compressor 92, comprising expander vortex chamber 94, and diffuser compressor chambers 96, separated by an inter-chamber throat. The refrigerant vapor from the vapor generator enters the primary inlet nozzle 100 shown in FIG. 8 and expands in an approximate free vortex from the inlet in the expander chamber 94 to a velocity about 5.1 times as great as the velocity in the primary inlet nozzle. The result is that the pressure in the expansion chamber 94 is rapidly reduced as a consequence of free vortex expansion.

$$\Delta P = \rho \frac{V_N^2}{2n} (1 - R^{2n})$$

where $\Delta p$, $\rho$, $V_n$, n and R are the pressure drop, fluid density, fluid velocity from the nozzle, the vortex coefficient, and ratio of outer to inner radii, respectively.

The lower pressure induces refrigerant vapor to flow into the chamber from the evaporator. After passing through the opening between the expander chamber 94, and diffuser chamber 96, the vapor mixture of primary and secondary flow experiences a large centrifugal force in the diffuser chamber 96.

The increase in the axial dimension has been shown by Fineblum and Volchkov et al. to increase vortex efficiency (n, the vortex coefficient, approaching 1) Further, if the end surfaces have an approximately hyperbolic shape as the axial dimension increases toward the center as shown, the boundary layer flow is reduced relative to the tangential flow. Therefore, the vortex flow approaches an ideal "free" vortex with n, the vortex coefficient, being close to unity.

The double vortex chamber flow inducer 92, in one embodiment, is conformed for maximum vortex flow efficiency and comprises as an essential element, with an inner concentric support for a plurality of spaced apart vanes 98, disposed at a critical angle to create a smooth transition between the incoming flow of expanded refrigerant to centrifugally directed outer flow toward the outlet.

In addition, vanes 98 are added in a manner conventionally used in the diffuser portion of a centrifugal compressor. The inner, leading edge of these vanes 98, as shown in FIG. 9, have a position along a diameter which is greater than the diameter of the inlet to the diffuser chamber by a factor of 1.6:1 or thereabouts. This is to result in about a 45 to 50% reduction of the tangential velocity prior to entering the space between the vanes 98. The angle between the vanes, which are slender and champfered to reduce drag, is shown here as about 22.5° . It is essential that a minimum angle of about 12.5° be used to permit efficient conversion of the kinetic energy of centrifugal flow to increase static pressure.

In brief summary, the tangential velocity entering the space between the vanes is reduced to about 50% and this is accomplished by location of inner leading edges of these vanes, using at least 12 vanes, and not more than 22 vanes evenly distributed around the diffuser chamber. It is contemplated that the diameter of the diffuser vortex chamber may be relatively large, about 4 or 5 times the diffuser chamber inlet diameter, and that it represents the major diameter of the double vortex chamber.

It is important to understand that the hyperbolic shape of the diffuser vortex chamber with the resulting reduction of the friction from the boundary layer flow in absolute as well as relative terms to the tangential flow permits a more efficient pressure build-up which is accomplished by free-vortex deceleration and which is aided by the critical angle of presentation between the vanes and the incoming flow to the diffuser vortex chamber. Based upon the further critical relationship of the effective diameter of the vanes to the diffuser chamber, the tangential velocity is converted to a pressure increase which is more uniform and significantly greater than that which can be achieved by the diffusion chamber of Modisette Patent mentioned in the prior art hereinabove.

DOUBLE VORTEX CHAMBER PERFORMANCE

For a nominal one-ton capacity (12,000 BTU/HR) the primary (tangential inlet) vapor flux will be approximately 15 lb./min. to achieve a very conservative secondary-to-primary mass flow ratio of only 0.27. A tangential inlet nozzle will accelerate the hot ($\approx 210°$ F. [98.9° C.]), high pressure, (262 psia) vapor to approximately 164 ft./sec., which is a Mach number of only 0.39 and which generates a velocity head of approximately 14.8 psia.

If the outer diameter is approximately 10.8" and the inner interchamber orifice is approximately 1.80" in diameter, the diameter ratio, R, of 6 will result in a vortex K factor of approximately 23.5 as predicted $$\text{Vortex } K \text{ Factor} = \frac{1}{n}(1 - R^{2n}) = \frac{1}{.85}(1 - 6^{1.70}) = 23.5$$

where n=0.85. A resulting pressure drop of approximately 216 psi brings the pressure in the central core to about 46 psia which is low enough to draw the refrigerant vapor out of the evaporator prior to flowing through the 1.8" diameter inter-chamber orifice into the diffuser vortex chamber 96.

Once in the diffuser chamber, the vapor will decelerate to about half of its tangential velocity when it reaches the inner edges of the diffuser vanes at a diameter of approximately 4.1". This is based on free vortex, $$V_i = V_o \left(\frac{d_o}{d_i}\right)^n = V_o \left(\frac{1.8''}{4.10''}\right)^{.85}$$

where $d_o$ and $V_o$ are the central diameter and central velocity, respectively. The vapor will be smoothly decelerated further as it flows through the vanes and into the volute shaped channel which surrounds the diffuser vanes. During the outward flow in the volute shaped channel, the vapor will continue to decelerate as the radius of the flow path increases and, as a result, the pressure and density will increase. Based on a conservative estimate of 55% for the diffuser pressure recovery efficiency, the final pressure leaving the diffusion chamber should be approximately 165 psia as required to force the vapor into the condenser to drive the refrigeration cycle.

Figure 10:
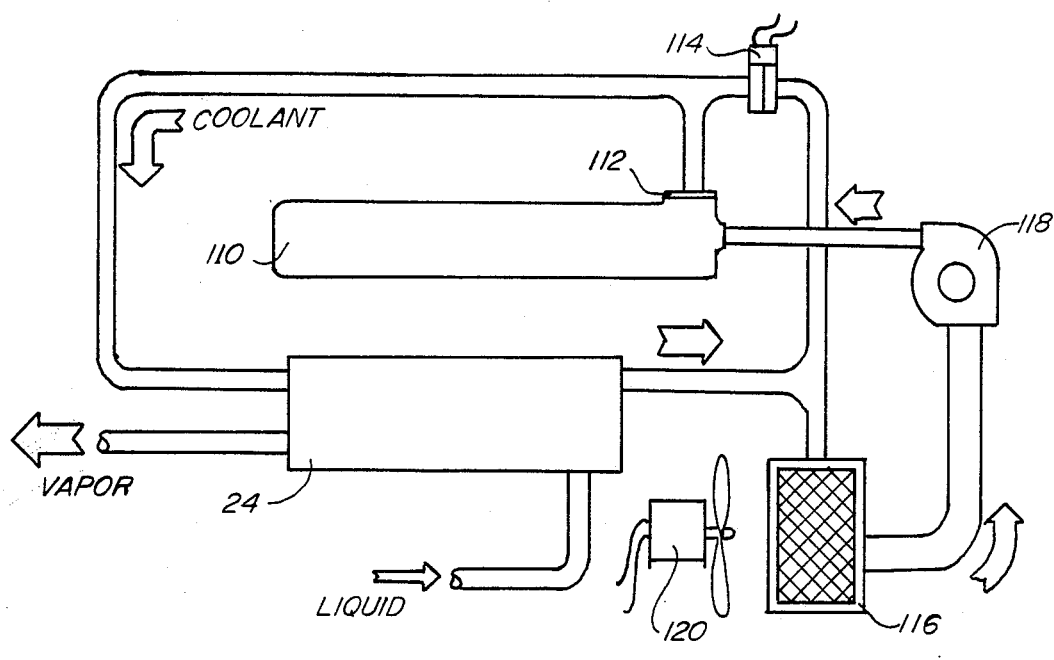
FIG. 10 shows schematic of coolant flow circuit.

The engine coolant system and the engine coolant system controls are integral to this invention as shown in FIGS. 10 and 10A. The cooling system comprises an engine coolant jacket 110 as in conventional liquid-cooled engines, a thermostatic valve means 112, a normally open (with no air conditioning) boiler by-pass valve 114, a coolant pump 118, a radiator 116, a coolant fan 120, a coolant-heated vapor generator 24, and connecting pipes and hoses and connector assemblies as required to assure a reliable flow circuit.

When the coolant is heated to about 230° F. (110° C.), the thermostatic value 112 opens to permit the coolant to flow through the open by-pass valve 114 to the radiator 116, through hose assembly 121 into the coolant pump 118 and back into the engine coolant jacket 110.

Figure 11:
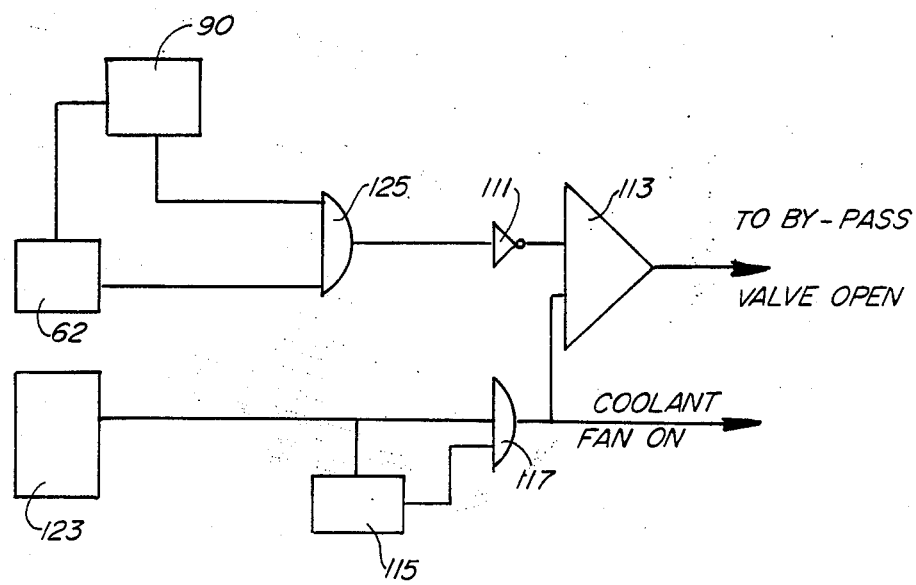
FIG. 11 shows a logic schematic for the coolant control system.

The relevant control system, as shown in FIG. 11, comprises a two-minute timer 62, a NOT logical element 111, a two-input OR logical element 113, a 10 second-timer 115, a coolant temperature switch 123, a two-input AND logical element 117 and another two-input AND logical element 125.

When the air conditioning "ON" switch has been activated for two minutes, the two-minute timer 62 will send a signal through the NOT logical element 111 to terminate any signal into the two element OR 113. If the coolant temperature is less than 250° F. (121° C.), the two-input OR logical element will be deprived of a signal and the coolant by-pass valve 114 will close and force the hot coolant into the coolant side of the vapor generator 24 to heat the generator so that when the liquid refrigerant from the refrigerant pump enters the vapor generator a bit later, it is rapidly converted into a superheated vapor for driving the thermal compressor means 26 or 92.

If this coolant temperature reaches 250° F. (121° C.), the engine will be protected by reopening the coolant by-pass valve 114, to thereby permit coolant flow into the radiator by signals from the temperature switch 123, timer 115, two-input AND 117 and two-input OR 113. The coolant fan 120 will also be activated by the same high temperature signal. These higher coolant temperatures are consistent with modern engines which are designed to suppress combustion quenching in high compression engines.

Figure 12:
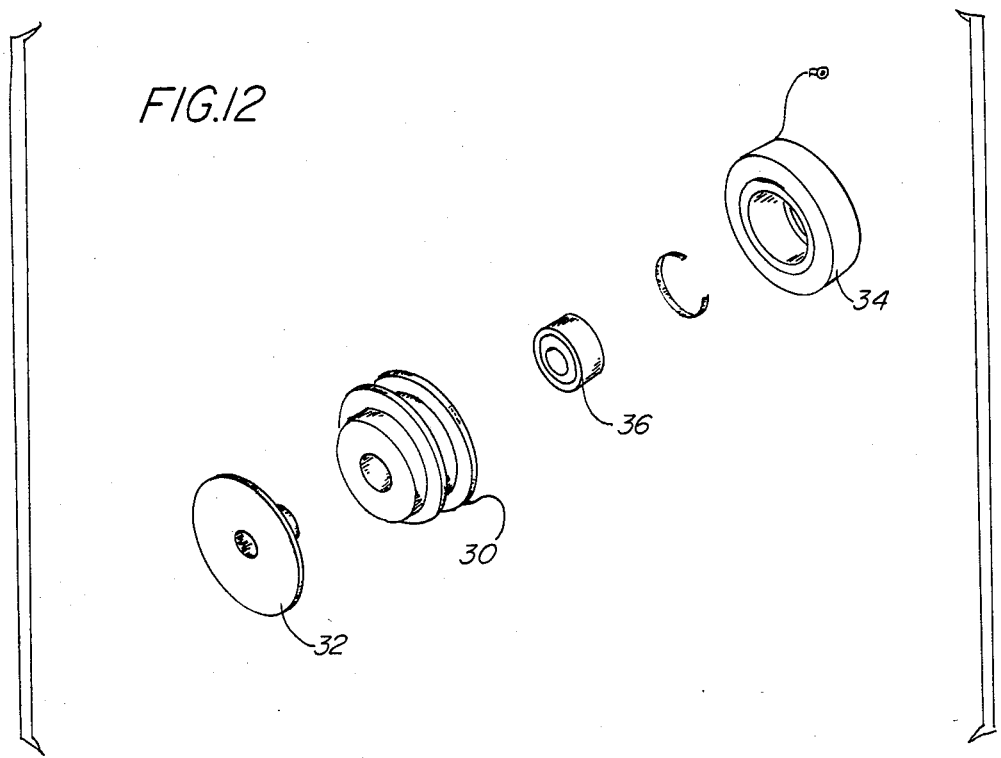
FIGS. 12 and 12A shows details of pulley and magnetic clutch portions of compressor drive.
Figure 12A:
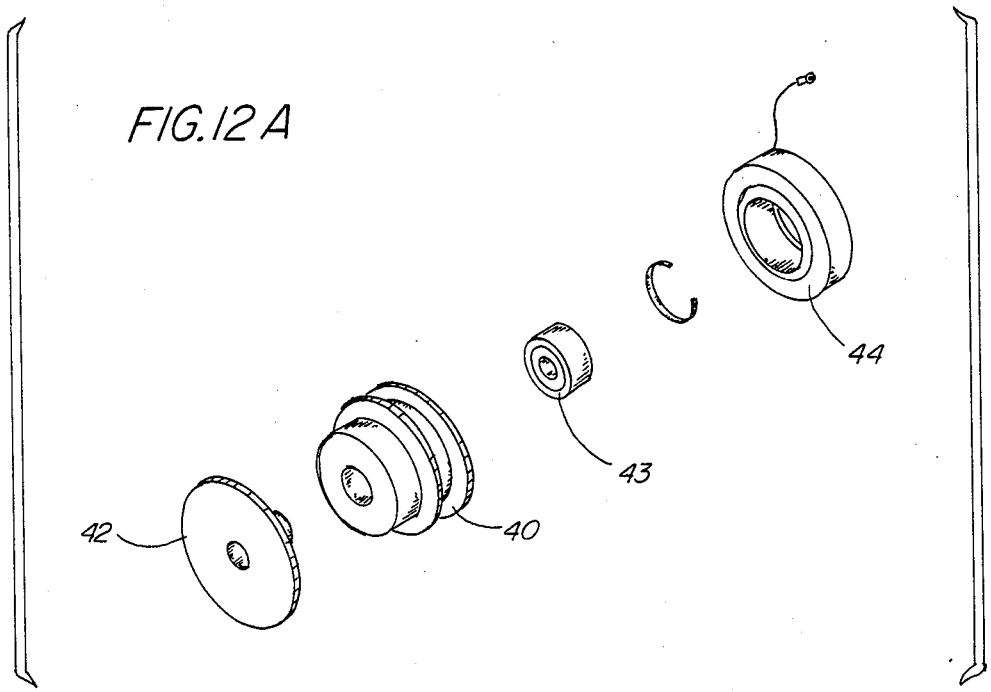

The magnetic clutch assembly details are shown in Figs. 12 and 12A for the mechanical compressor and refrigerant pump, respectively. The functional components are, for the mechanical compressor 10, a clutch 32, a pulley assembly 30, a clutch bearing 36, a bearing snap ring 38, a hub snap ring 39, and a clutch field assembly 34. When the clutch field assembly is activated by electrical current, a magnetic field is generated therein to drawing the clutch 32, toward the clutch field assembly 34 causing the clutch 32 to forceably contact the adjacent surface of the pulley assembly 30, so that the rotation of the pulley assembly 30, causes the clutch 32, to rotate also and to drive the mechanical compressor 10, by the central shaft of the clutch 32. When the logic circuit generates a compressor "OFF" signal, the current to the clutch field assembly 34 will be discontinued, the magnetic field therein will cease and he clutch 32, will be released from the adjacent face of the pulley assembly 30, so that the clutch shaft is no longer driven and neither is the mechanical compressor 10.

Similarly, the refrigerant pump clutch 42 is engaged to drive the refrigerant pump 22, when the clutch field assembly 44 is energized, and disengaged when the energizing current is removed to cause the pump 22 to cease operation.

Figure 13:
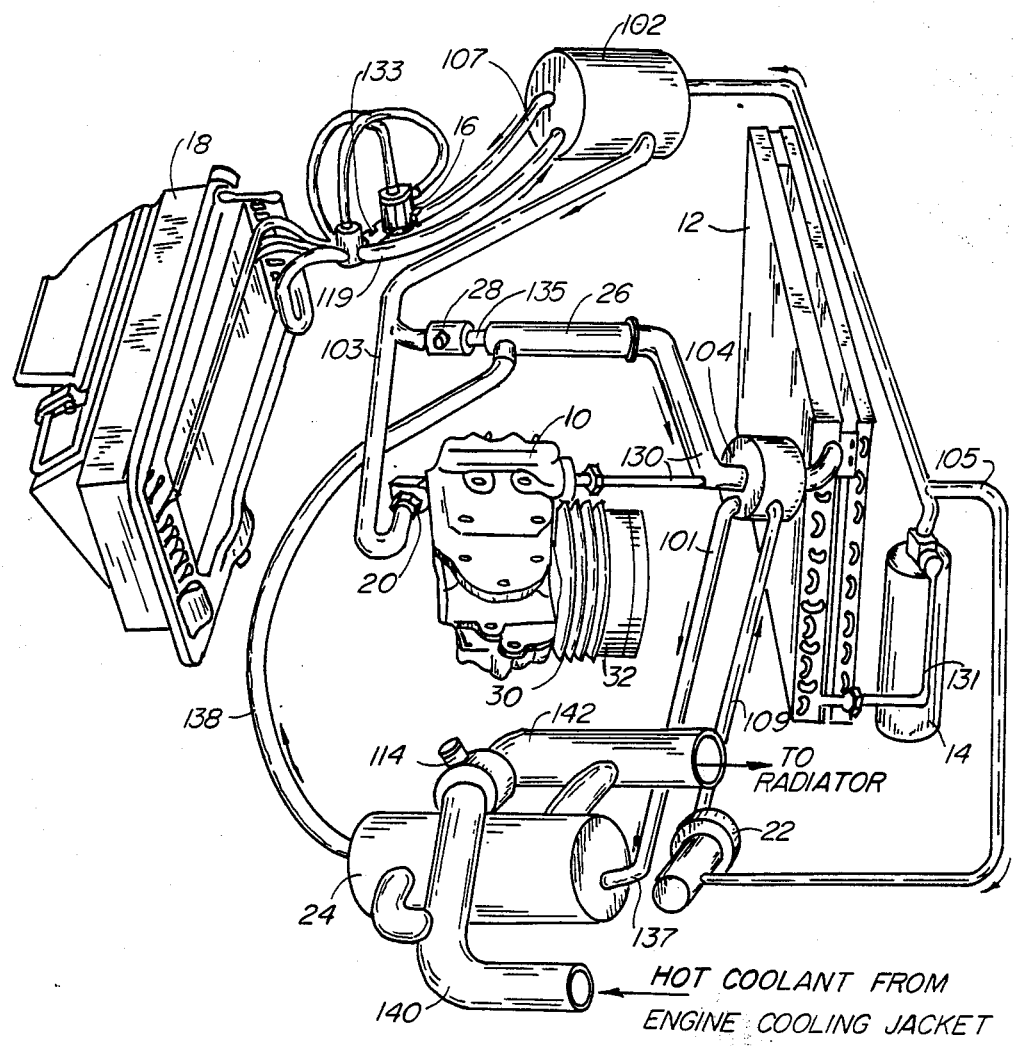
FIG. 13 shows a schematic of refrigerant flow circuit of an embodiment of the air conditioning system with an ejector, pre-cooler and regenerator as well as schematic of coolant flow circuit.

Another embodiment of this invention uses a pre-cooler 102, regenerator-desuperheater 104, and heat exchangers as shown in FIG. 13 to improve cooling effectiveness of the system. The components are the compressor 10, the condenser 12, the receiver 14, said pre-cooler heat exchanger 102, an expansion valve 16, or equivalent restriction means, evaporator 18, suction throttling valve 20, refrigerant pump 22 (either A.C. or clutch driven), a thermal compression means (here 26) a vapor generator heat exchanger 24 and said regenerator-desuperheater 104, control system as shown elsewhere, hoses and tubes to from required flow circuits to fluid dynamically connect said components as described below, and air flow controls in the passenger compartment to control air flow around the evaporator as in conventional installations.

These components are so arranged in the automobile, truck or motor-bus that the compressor 10 outlet directs refrigerant flow in refrigerant hose assembly 106 upstream of a "Y" joint which directs high pressure vapor into the hot side of the regenerator-desuperheater and through hose assembly 108 into the condenser 12 which is upstream of the hose assembly, 131 and the receiver 14 and another "Y" joint in the tube assembly 105, one branch of which directs liquid to the subcooler heat exchanger 102 and the other branch directs liquid into the refrigerant pump 22. The liquid from said pre-cooler heat exchanger 102, having been cooled by the evaporator 18 outlet flow, flows into the tube assembly 107, the expansion valve 16, tube assembly 133, and evaporator 18, which is immediately upstream of the hose assembly 119 and the inlet to the refrigerant vapor side of the pre-cooler 102, which is immediately upstream of a "Y" joint of hose assembly 103 which leads to the suction throttle valve 20 and compressor 10 in one branch and the check valve 28 and secondary inlet to the ejector 26 or other thermal compression means in the other branch. The other branch of the "Y" joint in pipe assembly 105, just downstream of the receiver 14, directs liquid into refrigerant pump 22, from which the high pressure liquid flows through pipe assembly 109 into the liquid side of the regenerator 104, where it is preheated, and through pipe assembly 101, into the vapor generator heat exchanger 104 and thence through pipe assembly 138 into the primary inlet of the ejector 26 or other thermal compression means. Hot coolant flows from the engine coolant jacket 110, through the coolant hose 140 into the vapor generator 24, where its heat is 1 transferred into the boiling refrigerant and then through hose assembly 142, into the engine radiator 116.

The system described in FIG. 13 operates in a manner similar to embodiments shown in FIGS. 1, 2 and 4 such that the air conditioner switch 90 initially actuates the compressor 10. Later, some of the refrigerant liquid from the condenser flows into and through the receiver 14 through 105, and toward the refrigerant pump 22, which is downstream of the liquid "Y". The refrigerant pump 22 is actuated about 3 minutes after the compressor 10. When the engine coolant is hot enough (about 230° F. [110° C.] or higher), the high pressure ($\approx$262 psia, 247 psig) liquid refrigerant will be heated by the hot engine coolant and, converted into a superheated, high pressure vapor, which is capable of driving the thermal compression means to induce low pressure vapor from the evaporator 18, and out through the diffuser at high pressure ($\approx$165 psia), through the regenerator 104 and through hose assembly 108 toward the condenser 12, wherein the vapor will exothermally condense. This action of the ejector thermal compressor 26 (or vortex chamber inducer 92) will cause the vapor from the evaporator to by-pass the compressor 10 and to, thus, fluid-dynamically unload the compressor 10 and greatly reduce the energy required to drive said compressor. The pressure switch 61 in the diffuser outlet acts to turn off the compressor 10 when the diffuser output pressure of 145 psig is reached.

The thermostatic switch 63 acts to shut off both the compressor 10 and pump 22 whenever the evaporator temperature drops to approximately 32° F. (0° C.) or lower and to restore the operation of the compressor 10, when the evaporator warms up, and refrigerant pump 22, whenever the evaporator 18 temperature heats up to above 32° F. for two minutes. As long as the evaporator temperature remains below 52° F. (11° C.), the compressor will remain deactivated after the refrigerant pump operation has been initiated.

If the refrigerant pump should fail, the pressure switch would detect the loss in diffuser outlet pressure and/or the evaporator temperature switch would detect a warm evaporator, and the compressor 10 would be reactuated to drive the refrigerant around the circuit to continue the operation of the air conditioning system, if these failure indications are sensed. Thus, this system improves the reliability as well as efficiency of the air conditioning system in comparison to conventional systems. This control system is shown schematically in FIG. 3 and FIG. 3A.

SIZING OF SYSTEM

In following accepted practice, the velocities in the refrigeration system must be limited to prevent excessive pressure drop but sufficient to drive any lubricant forward.

For a nominal one-tone system, the line from the evaporator will have an internal diameter (I.D.) of between approximately 1.00" and 1.125". The compressor flow of approximately 4.1 pounds per minute of refrigerant shall travel from the compressor in a line with an I.D. of 0.89±0.05" in diameter.

The liquid line to the thermal expansion valve or other pressure reduction restrictor means upstream of the evaporator will be approximately 0.4375±0.0375" (or ½" Type L copper O.D. tube). The liquid line to and from the refrigerant pump shall be approximately 0.78+0.02" (⅞" O.D. Type L copper tube or equivalent).

The line from the thermal compressor shall transmit approximately 19 pounds of refrigerant per minute in a tube between 2" and 2.25" in internal diameter.

The refrigerant pump shall be sized to pump 15 pounds per minute - 1.48 gallons per minute. These sizes will accommodate a typical 1-ton air conditioning system.

PERFORMANCE AND ENERGY BALANCE OF SYSTEM

A typical automobile engine rejects 25-35% of the heat energy in the consumed fuel as heat in the cooling system. Thus, at least 15 horsepower of a modest 60 horsepower engine is available in the cooling system. If the coolant temperature drops from 230° F.(110° C.) to 140° F. (60° C.) in the counter-flow vapor generator at least 70% of this energy is available to the thermal compression system through the vapor generator. The coefficient of performance (C.O.P.) of well-designed thermal compression driven refrigeration systems is typically between 0.20 and 0.30. If the C.O.P. is only 0.20, the effective energy available to drive the cycle is (60 HP×0.25×0.70×0.20) 2.1 horsepower, which is approximately what is required for a two ton-refrigeration system, while, typically, a one-ton unit is sufficient for most automobiles.

The power required to drive a refrigerant pump (assuming a modest 70% efficiency) is approximately 0.14 HP which represents an energy saving of more than 80% when the heat-powered thermal compressor is driving a nominal one-ton air conditioning system.

The primary flow, 15 pounds per minute, which has an enthalpy of 102 BTU per pound, gives up all available energy in the condenser where the refrigerant has an enthalpy of 90 BTU per pound. The net energy available is therefore 12 BTU's per pound for the 15 pounds per minute.

The evaporator outlet flow of approximately 4 pounds per minute must be energized from a minimum 82 BTU per pound up to 90 BTU per pound into the condenser. The thermal compressor required to accomplish this would require an efficiency (8 BTUS/lb×4 lbs.)/(12 BTU×15 lbs.×100) of 18% which is easily attainable since well-designed thermal compressors have demonstrated efficiencies above 20%.

Having thus disclosed the invention, What is claimed is:

1. In a hybrid air conditioning system for a motor vehicle comprising a mechanical compressor driven by the engine of said motor vehicle and, in a refrigerant circuit parallel, therewith, a thermal compression means, said mechanical compressor and said thermal compression means in a circuit including an evaporator, a suction valve, a condenser, a reservoir, and expansion, pressure reduction means upstream of said evaporator, a refrigerant pump, a vapor generating heat exchanger and a means for conducting coolant from the coolant jacket of said engine into and through said vapor generating heat exchanger in thermal contact with liquid refrigerant, various temperature and pressure detection means, and a control circuit, that improvement comprising:

a check-valve in fluid flow series with said thermal compression means;
   an electrical ON-OFF switch which turns on said mechanical compressor as soon as the air conditioner is turned on when said engine is running;
   a timer switch for turning on said refrigerant pump after a period of said mechanical compressor operation sufficient to assure that said mechanical compressor has been effective in achieving the initial cool-down of the passenger compartment;
   a coolant by-pass valve in engine coolant line from said coolant jacket of said engine to the radiator of said motor vehicle;
   a pressure switch at the outlet of said thermal compression means adapted to sense a minimum pressure of refrigerant vapor as required for condensation, said pressure switch actuating controls to unload said mechanical compressor by turning off said mechanical compressor when said thermal compression means is capable of driving refrigeration system as indicated by the high pressure at the outlet of said thermal compressor;

whereby, initially, the refrigerant vapor is pulled out of said evaporator, compressed and forced into said condenser by the action of said mechanical compressor which is powered by said engine, said refrigerant vapor condensing into liquid within said condenser, from whence it flows into and through said reservoir and thence through said expansion, pressure-reduction means which is immediately upstream of said evaporator which is in heat transfer contact with air in said passenger compartment, wherein the refrigerant in said evaporator is endothermally evaporated such that heat is absorbed from said passenger compartment through the evaporator into said evaporating vapor and such that the vapor is pulled from said evaporator through said suction valve into the suction inlet of said mechanical compressor until sufficient time has elapsed for the coolant in said engine coolant jacket to get hot enough to boil said refrigerant in said vapor generating heat exchanger, the time being measured by said timer which acts to close off said coolant by-pass valve, thus forcing coolant to flow through said vapor generating heat exchanger, and some cool-down has been achieved in said passenger compartment, additional time being measured by another said timer which acts to energize said refrigerant pump which draws some of the liquid refrigerant from the fluid conduit downstream of said reservoir and drives said liquid into said vapor generating heat exchanger wherein the hot engine coolant transfers sufficient heat to boil the high pressure liquid refrigerant such that the resulting high pressure vapor flows from said vapor generating heat exchanger into the primary inlet of said thermal compression means, wherein the vapor is greatly accelerated and wherein sufficient suction is created to draw refrigerant vapor from said evaporator and wherein the vapor is compressed and from whence the compressed vapor is driven into said condenser wherein the vapor is exothermally condensed and from whence the liquid refrigerant flows into and through said reservoir and into a liquid refrigerant conduit which directs some refrigerant into said refrigerant pump and some refrigerant into said expansion, pressure-reducing means which releases low pressure liquid refrigerant for inlet into said evaporator wherein the refrigerant endothermally absorbs heat from the evaporator and from which the refrigerant flows into the secondary inlet of said thermal compression means in the refrigerant branch which flows from the evaporator outlet tube at a point between said evaporator and said suction valve, into said branch which contains the thermal compression means and check valve in series, to continue the refrigeration cycle which is driven by said thermal compression means which receives its energy from the waste heat in the hot engine coolant and thereby conserving the energy which is usually used to drive said conventional mechanical compressor which is taken from said engine, thus improving the fuel consumption of such vehicles so equipped.

2. A hybrid air conditioning system as claimed in claim 1 wherein said hybrid system includes a sensing means for indicating the temperature in the evaporator and further includes thermal switching means responsive to the temperature of the refrigerant in the evaporator whereby said thermal switch reactivates the mechanical compressor when the temperature sensed in said evaporator rises to about 52° F.

3. An air conditioning system as claimed in claim 1 wherein said compressor is connected to a driving means selected from the engine-driven pulleys by means of a magnetic clutch or from an A.C. motor.

4. An air conditioning system as claimed in claim 1 wherein said thermal compression means is an ejector which is constructed to form a supersonic stream from a primary inlet-nozzle and a standing wave between said primary nozzle and the inlet to a mixing chamber and in which said ejector comprises said mixing chamber having a length which is at least eight times the diameter of the outlet of said primary nozzle and an outwardly curved wall of a diffuser with increasing divergence angle toward the outlet of said diffuser with final divergence angle between 30° and 45°.

5. A hybrid automobile air conditioning system as claimed in claim 1 wherein said thermal compression means is a double vortex chamber flow inducer which comprises a first vortex chamber with one or more tangential convergent nozzles at the outermost edge of said first vortex chamber, a central inlet to one side of said first vortex chamber and a central interchamber passage on the opposite side of said first vortex chamber, said interchamber passage leading to the second vortex chamber which has a tangential outlet at the outermost edge such that high pressure refrigerant vapor enters said one or more tangential inlets of said first vortex chamber as the primary flow of said double vortex chamber flow inducer and low pressure vapor from the evaporator is induced to flow into the central inlet of said first vortex chamber as secondary flow by reason of low pressure generated in central portion of said first vortex chamber by action of free vortex expansion within said first vortex chamber and wherein a mixture of primary and secondary vapors flows from said first vortex chamber through said central interchamber passage into the second vortex chamber wherein said mixture centrifugally flows outward toward said tangential outlet of said second vortex chamber with free vortex deceleration and pressure increase until decelerated vapor at increased pressure flows out of said tangential outlet.

6. An air conditioning system as claimed in claim 5 wherein said thermal compressor in a double vortex chamber flow inducer which comprises a first vortex chamber fed by one or more tangential and convergent inlet nozzles as primary inlets, wherein the said first vortex chamber is about six times the central orifice that connects the two said vortex chambers, a central secondary inlet and a said second vortex chamber which is about seven to eight times the central orifice in diameter and a central axial dimension of the said vortex chambers to be approximately five- to six-tenths of the diameter of each of said chambers as a result of the gradual outward curve in the walls of said vortex chambers so the axial dimension between the wall of each of said vortex chambers increases from the outer rim to the central axis of said vortex chambers.

7. An air conditioning system as claimed in claim 6 wherein said thermal compression means is a double vortex chamber flow inducer, said double vortex flow inducer comprises a first vortex chamber fed by one or more tangential and convergent inlet nozzles, the other circumference of said first vortex chamber being about six times the diameter of the inlet to a diffuser chamber, a central inlet from the evaporator suction line into said first chamber, said diffuser chamber being about 1.2 times greater than said inlet chamber and including a plurality of thin, radially positioned vanes, there being at least 10 said vanes and not more than 22 said vanes, to suppress large scale turbulences whereby said diffuser chamber provides a substantial and relatively smooth deceleration and recompression of refrigerant vapor which is centrifugally directed outward toward a tangential outlet from said diffuser chamber.

8. An air conditioning system as claimed in claim 7 wherein within said diffuser chamber the inner, leading edge of said vanes is uniformly positioned at about a diameter 1.8 times the inlet to said diffuser chamber at an angle of about 85° relative to the radii from the center, said vane support being the sides of said diffuser chamber.

9. A hybrid air conditioning system as claimed in claim 1 wherein said hybrid circuit includes a sensing means for indicating the pressure in the outlet of said terminal compressor means and further includes pressure switching means responsive to the pressure of the refrigerant in the outlet of said thermal compressor whereby said pressure switch reactivates the mechanical compressor when the pressure sensed in said diffuser outlet of said thermal compression means falls to a pressure too low for reliable condensation, which is about 132 psia (117 psig), for R12 refrigerant or below, and said mechanical compressor is reactivated.

10. A hybrid air conditioning system as claimed in claim 1 wherein said hybrid circuit includes a sensing means for indicating the pressure just upstream of said condenser and further includes a pressure switching means responsive to the pressure of the refrigerant whereby said pressure switch deactivates both the said compressor and said refrigerant pump when the sensed pressure just upstream of said condenser is approximately 80 psig or below indicating deficiency of refrigerant during operation of air conditioner.

11. A hybrid air conditioning system as claimed in claim 1 shall comprise a pre-cooler which causes heat exchange contact between the relatively cool refrigerant vapor leaving said evaporator and the warm liquid refrigerant from the said reservoir so that the liquid refrigerant is cooled somewhat prior to expansion to low pressure downstream of said expansion pressure reduction means, and a regenerator-desuperheater wherein liquid refrigerant is preheated prior to entering said vapor generator and refrigerant vapor is partially cooled prior to entering said condenser.

* * * * *